M. F. DAVIS.

Row Lock.

No. 9,269. Reissued June 29, 1880.

*Witnesses:*

Henry Eichling

M. F. Clifton

*Inventor:*

Michael F. Davis

By J. P. Smith his Atty.

N. PETERS, PHOTO-LITHOGRAPHER, WASHINGTON, D. C.

UNITED STATES PATENT OFFICE.

MICHAEL F. DAVIS, OF PORTLAND, MAINE.

ROWLOCK.

SPECIFICATION forming part of Reissued Letters Patent No. 9,269, dated June 29, 1880.

Original No. 165,072, dated June 29, 1875. Application for reissue filed February 12, 1880.

*To all whom it may concern:*

Be it known that I, MICHAEL F. DAVIS, of Portland, in the county of Cumberland and State of Maine, have invented a new and useful Improved Oar-Lock; and I do hereby declare the following to be a full, clear, and exact description of the same, reference being made to the accompanying drawings, forming part of this specification, in which—

Figure 1:
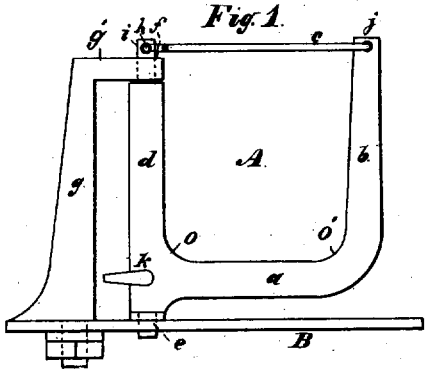
Figure 2:
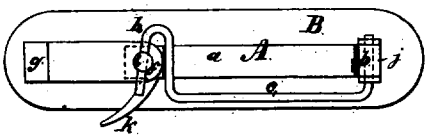
Figure 3:
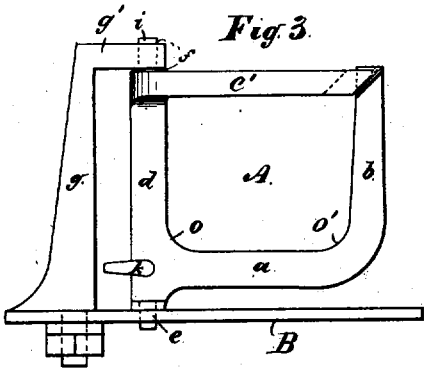

Figure 1 is a side elevation; Fig. 2, a top plan. Fig. 3 is a side elevation, and Fig. 4 a top plan, of a modification of the said lock.

Same letters show like parts.

The object of my invention is to produce an oar-lock of improved construction and operation.

The oar-lock consists of a frame, A, composed of the parts *a b d*. This may be set into a plate or foot, B, and turn in the foot on the pivot *e*. This foot may be secured to the outrigger or gunwale. The upright part *d* has also a pivot, *f*, which works in a hole in the horizontal arm *g'* of the brace *g*. This brace may also be secured to the foot B, and screwed to the outrigger or gunwale by means of a nut and washers or any other convenient method. The upright *d* receives the bearing of the oar while the stroke is being made.

The said frame is represented as composed of the uprights *d* and *b* and the bottom bar, *a*, all of which present on their inside faces longitudinally straight surfaces, except at the angles *o* and *o'*, that may be rounded. There is a special design in the form of these parts as shown, the same being intended and adapted to accomplish a special object, this object being to secure just the requisite position of the oar in rowing by the action of the lock upon the shaft of the oar, thus obviating the necessity of the oarsman exerting by the hand the force requisite to hold the oar in the required position.

By having the surface of the oar-shaft that is in contact with the upright *d* flat and at the proper angle to the blade, and the inner face of said upright straight longitudinally, it is evident that there will be no tendency of the oar to roll in the lock, and when the pull is given the hand is released from all strain to hold the oar from rolling. The same result from the same causes is secured when feathering and when turning the boat.

The axis of the pivot of the upright *d* is preferably in the vertical center of said upright, so that the force of the lateral pressure of the button of the oar against said upright, which occurs in rowing, will be received on the line of said axis, thereby obviating the swinging outward of the lock on its pivot by the thrust of the button, and a consequent jar which takes place when the said axis is moved forward of the center of said upright. If the center of said upright *d* is outside—that is, forward—of said axis of pivot the swinging of the lock inward will be prevented by the pressure of the button on both *d* and *b* simultaneously, whereby the lock is held steady and a jar is avoided; but if the upright *d* is inside—that is, aft—of said axis of pivoting *i* the thrust of the button must swing the lock outward and cause a jar.

It will be seen that the pressure of the stroke is sustained by the combination of the upright *d* and its pivots and the supplemental brace *g*. The oar-lock is capable of turning, to a certain extent, upon its two pivots *e* and *f* as the stroke is made, turning outwardly or away from the gunwale when the oar is thrown back preparatory to the stroke, and slowly swinging inward as the stroke is given.

The rowlock as now shown in the drawings is placed so that in a fore-and-aft line the standard *g* is forward; but it is evident that the said parts may be reversed, and *g* may be placed aft, without in any material degree departing from my invention.

Figure 4:
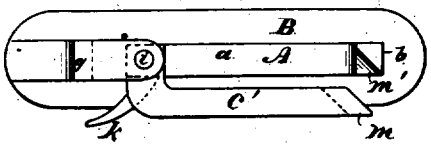

C is a bar which extends across the top of the frame A, whereby the oar is prevented from unshipping or rising in the lock. It is offset outward from the standard *d* and arm or side *b*, and out of the horizontal plane of the bottom *a* of the frame A, so as to give the largest space to the oar-loom, and so as not to interfere with the inclination of the oar from the lock downward into the water, or vice versa. This cross-bar may be made to swing at one end, *j*, on one of the uprights of the frame, the other end being provided with a locking device to secure it to the opposite arm. In Fig. 2 such a locking device is shown, consisting of a hook, *h*, which passes into a hole, *i*, in the pivot *f*. In place of this bar being hinged to the frame it may be made rigid on one of the upright arms of the frame, preferably to the upright *d*, as seen in Figs. 3 and 4, where it is designated by the reference-letter O′, and made to extend across the top of the frame, leaving only sufficient space between the outer end, *m*, of the said bar and the upper end, *m′*, of the upright arm *b* to permit the introduction between said ends of the blade of the oar edgewise into the lock, the said ends being preferably beveled for the purpose.

Preferably I make my lock rectangular in shape, thus forming but three bearings for the beam of the oar, and so diminishing considerably the friction of the loom within the lock.

*k* shows a brace projecting from the lower end of the standard *d*, which regulates the extent to which the lock can turn or swing by contact with the supplemental brace *g*. This brace *k* can be made adjustable in order to increase or diminish at will the extent to which the lock can be swung.

It will be seen that the bearings of the oar-lock in the gunwale or outrigger are on the forward side of the lock, which serves to diminish the leverage or strain upon the woodwork of the rail or upon the outrigger. This is an advantage over the common oar-lock in use, which has a pivot in the center.

The old form of rowlock was made with tholepins or by cuttings in the gunwale of the boat, which last were sometimes lined with metal and had vertical sides and a straight bottom; but I am not aware that the construction now shown has been before known or used in a swinging rowlock, and this gives special advantage in the stroke and feather of the oar, since it gives uniform leverage of the oar and a uniform angle to the blade not heretofore obtained, and will also prevent loss of motion of the oar in the rowlock.

I am also aware that pivoted and swinging rowlocks having curved sills or bottom have been used; but neither of these accomplishes the purpose now aimed at by the present invention—namely, preventing loss of power and motion in rowing.

What I claim as my invention, and desire to secure by Letters Patent, is—

1. A rowlock consisting of a pivoted frame and standard or brace, said rowlock provided with a bar across the top of the frame that is offset outward, as specified, so that it is outside of the perpendicular plane of the bottom *a* of the frame, substantially as and for the purpose described.

2. The standard or brace *g*, extending upward from the foot or support and over the pivotal point of the rowlock, in combination with the frame of the rowlock pivoted in said standard or brace, substantially as shown and described.

3. A rowlock consisting of a frame pivoted at the bottom in the foot B and at the top in the projection *g′*, extending from the upright *g*, substantially as described.

4. The combination, with a rowlock consisting of a pivoted frame, of a bar across the top of the frame, that is pivoted at one end to one of the uprights of the frame and provided with a locking device to secure the opposite end to the other upright, as and for the purpose described.

5. In combination with a swinging rowlock, substantially as described, a spur and a suitable abutment against which said spur is stopped, substantially as described.

6. A swinging rowlock having straight sides *b* and *d*, straight bottom *a*, and a bar across the top, substantially as and for the purposes set forth.

7. A rowlock having its top bar offset or out of line with the base of the rowlock, substantially as and for the purposes set forth.

8. A swinging rowlock having straight sides *b* and *d* and straight bottom *a*, substantially as and for the purposes set forth.

MICHAEL F. DAVIS.

Witnesses:
M. F. CLIFTON,
B. S. CLARK.